United States Patent [19]

Tsuchiya et al.

[11] Patent Number: 5,270,852
[45] Date of Patent: Dec. 14, 1993

[54] OPTICAL SHUTTER-CAMERA

[75] Inventors: Yutaka Tsuchiya; Katsuyuki Kinoshita, both of Hamamatsu, Japan

[73] Assignee: Hamamatsu Photonics K.K., Hamamatsu, Japan

[21] Appl. No.: 744,501

[22] Filed: Aug. 14, 1991

[30] Foreign Application Priority Data

Aug. 14, 1990 [JP] Japan .................................. 2-214682
Aug. 9, 1991 [JP] Japan .................................. 3-200670

[51] Int. Cl.$^5$ .................... G02B 26/08; G02F 1/01; G02F 1/29
[52] U.S. Cl. .................................. 359/299; 359/240; 359/211
[58] Field of Search ................ 359/240, 244, 299, 17, 359/19, 210, 211, 197; 354/226, 233

[56] References Cited

U.S. PATENT DOCUMENTS

| | | | |
|---|---|---|---|
| 3,372,972 | 3/1968 | Schmidt et al. | 359/299 |
| 3,395,961 | 8/1968 | Ready | 359/240 |
| 4,585,301 | 4/1986 | Bialkowski | 359/240 |
| 4,880,296 | 11/1989 | Ditman, Jr. | 359/299 |
| 5,126,874 | 6/1992 | Alfano et al. | 359/240 |

FOREIGN PATENT DOCUMENTS

0269014A1 6/1988 European Pat. Off. .
0269014B1 4/1992 European Pat. Off. .

OTHER PUBLICATIONS

Kinoshita, "New Picosecond Electronic Framing Camera", SPIE, vol. 569 High Speed Photography, Videography, and Photonics III (1985).
Li et al., "Ultrafast all-optical deflection based on an induced area modulation in nonlinear materials", Optics Letters, No. 6, Mar. 15, 1992, pp. 438–440.

*Primary Examiner*—Bruce Y. Arnold
*Assistant Examiner*—Evelyn A. Lester
*Attorney, Agent, or Firm*—Cushman, Darby & Cushman

[57] ABSTRACT

An optical shutter-camera includes a first optical unit, a deflecting unit, and a second optical unit. The first optical unit receives image rays from a subject and outputs first optical image rays to form a first optical image of the subject. The deflecting unit includes a deflection member and a pumping unit. The deflection member is a nonlinear optical material whose refractive index is varied by beam radiation. The pumping unit radiates a pumping beam having a variable intensity to a required region of the deflection member and varies the refractive index of the required region to variably deflect optical paths of the first optical image rays. The deflection unit is positioned so that a deflection center of the optical paths of the first optical image rays, formed when the variable intensity-pumping beam in incident on the deflection member, substantially agree with a position where the first optical image is formed. The second optical unit receives the first optical image rays from the deflection unit and outputs second optical image rays to form a second optical image of the subject. The second optical unit includes an aperture. The aperture restricts one of the first optical image rays and the second optical image rays.

13 Claims, 4 Drawing Sheets

OPTICAL SHUTTER-CAMERA

BACKGROUND OF THE INVENTION

1. Field of the Invention

This invention relates to an optical shutter-camera which shutters by all-optical processing.

2. Related Background Art

A camera which takes by high-speed shuttering an arbitrary instantaneous image of an object or a figure whose shape and brightness quickly change, and obtains a stationary image is known, e.g., in Japanese Patent Laid-Open Publication No. 150546/1985. A framing camera which continuously takes pictures at high speed such arbitrary instantaneous image is known in, e.g., Japanese Patent Laid-Open Publication No. 150545/1985.

However in these prior art cameras, an optical image is converted into a photoelectrons, and then the photoelectrons are electrostatically deflected at high speed for shuttering. Resultantly images of good resolution and high sensitivity cannot be obtained. That is, rays are converted temporarily into electrons by a photocathode, and due to a Coulomb's force exerted between the electrons even though the force is trivial, the resultant images are blurred. The sensitivity of the photocathode is wavelength dependent. In addition it is difficult to obtain 100% of photoelectric transfer efficiency. Accordingly it is a disadvantage that the drop of the sensitivity is unavoidable.

SUMMARY OF THE INVENTION

An object of this invention is to provide an optical shutter-camera which can basically solve these problems. That is, an object of this invention is to provide an optical shutter-camera of high resolution and sensitivity.

An object of this invention is to provide an optical shutter-camera comprising first optical means for receiving image rays from a subject and forming a first optical image of the subject; deflecting means including a deflection member of a nonlinear optical material whose refractive index is varied by beam radiation; and pumping means for radiating a pumping beam having a variable intensity to a required region of the deflection member and varying the refractive index of the required region to thereby variably deflect optical paths of the rays from the first optical means, the deflection means being so positioned that a deflection center of the optical paths formed when the variable intensity-pumping beam is radiated from the pumping means to the deflection member substantially agree with a position where the first optical image is formed; second optical means for receiving the rays from the deflection means and forming the image of the subject as a second optical image; aperture means for restricting those of the rays from the first optical image that can form the second optical image.

In such optical shutter-camera, a refractive index of the required region of the deflection member is varied with a change of an intensity of the pumping beam, and the required region functions as a deflecting element, such as a prism. The variation of an refractive index of the required region degrades or improves the function of the deflecting element, and deflection degree of the optical paths of the rays. Consequently the rays are scanned transversely of the aperture of the aperture means, and the shuttering is performed. By varying an intensity of the pumping beam at high speed, an instantaneous image of a short exposure time can be made. At this time, the first optical means forms a first optical image of the subject at a deflection center, and the second optical means can cause the rays to form a stationary and unblurred second optical image. An intersection of backward extensions of the rays deflected in the required region of the deflection member and going out of the deflection member is called the deflection center. The deflection center does not necessarily locate in the deflection member and can be outside the deflection member.

The pumping means may comprise third optical means for causing the pumping beam from the pumping beam source to enter the deflection member in the direction normal to the optical paths of the rays; and restricting means positioned of an optical path of the pumping beam for defining the required region for the pumping beam to be radiated to. The restricting means may be a filter, restriction plate, or other equivalent means.

Furthermore, an object of this invention is to provide an optical shutter-camera comprises restricting means provided an aperture having two sides intersecting each other, and the required region for the pumping beam to be radiated to is a three-dimensional shape containing two flat surfaces each intersecting the optical paths of the rays in the deflection member, and intersecting each other.

Furthermore, an object of this invention is to provide an optical shutter-camera which includes an angle adjusting lens for adjusting an angle of the rays entering the deflection member, and adjusting an angle of the rays entering the aperture of the aperture means.

Furthermore, an object of this invention is to provide an optical shutter-camera in which an intensity of the pumping beam from the pumping beam source is ramps up and down.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

DESCRIPTION OF THE PREFERRED EMBODIMENT

Embodiments of this invention will be explained in good detail with reference to the drawings attached hereto.

Figure 1:
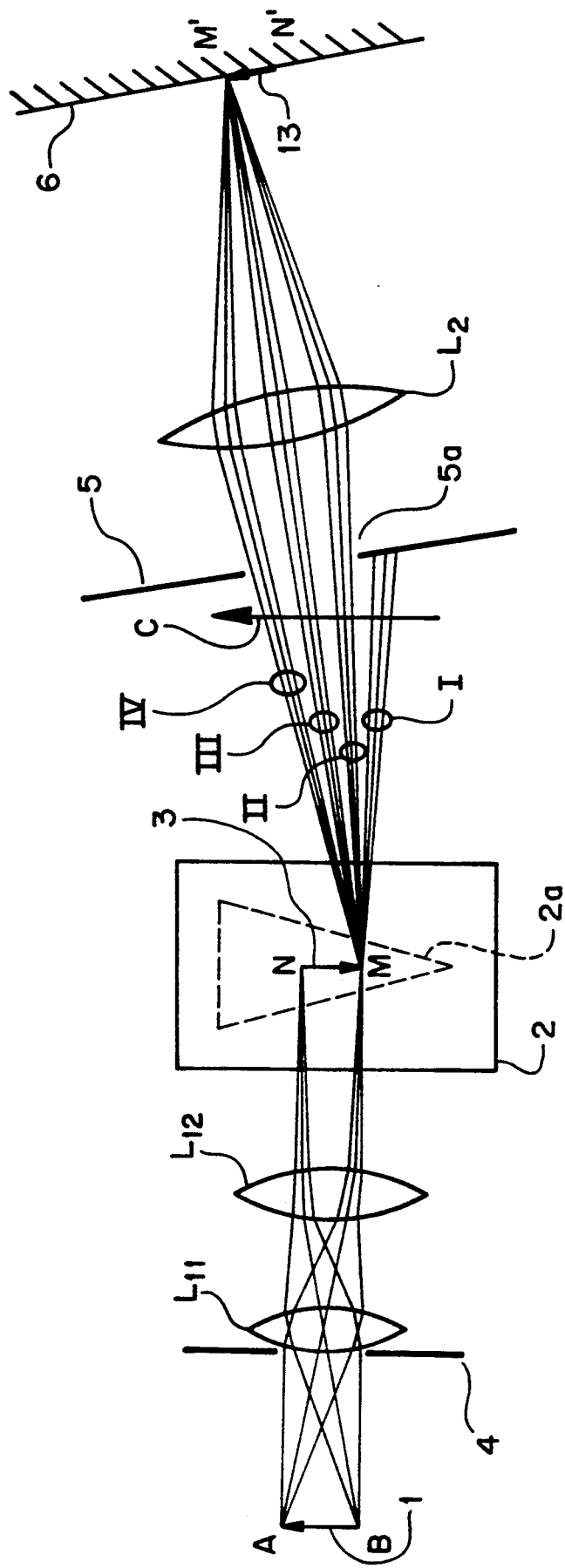
FIG. 1 is a perspective view of a major part of the optical shutter-camera according to the first embodiment.

FIG. 1 schematically shows the structure and operation of the optical shutter-camera according to this invention. This camera is, in terms of function, divided into three units, i.e., a first optical image forming unit, a beam-shuttering (exposure time determining) unit, and a second optical image forming unit.

The first optical image forming unit comprises an optical lens $L_{11}$ for converging image rays from a subject 1 to form an image, and a deflection member 2 in which the image rays from the subject 1 through the optical lens $L_{11}$ forms the image. Between the optical lens $L_{11}$ and the subject 1 there is provided an optical diaphragm 4 for suitably (variably) restricting a beam radius in a section normal to a travelling direction of the image rays. Between the optical lens $L_{11}$ and the deflection member 2 there is provided an angle adjusting lens $L_{12}$ for adjusting an angle of the rays entering the second optical image forming unit. The deflection member 2 is provided by a nonlinear optical material whose refractive index varies by beam radiation. A first optical image 3 is formed at a deflection center of the deflection member 2. This deflection center will be explained later.

Figure 2:
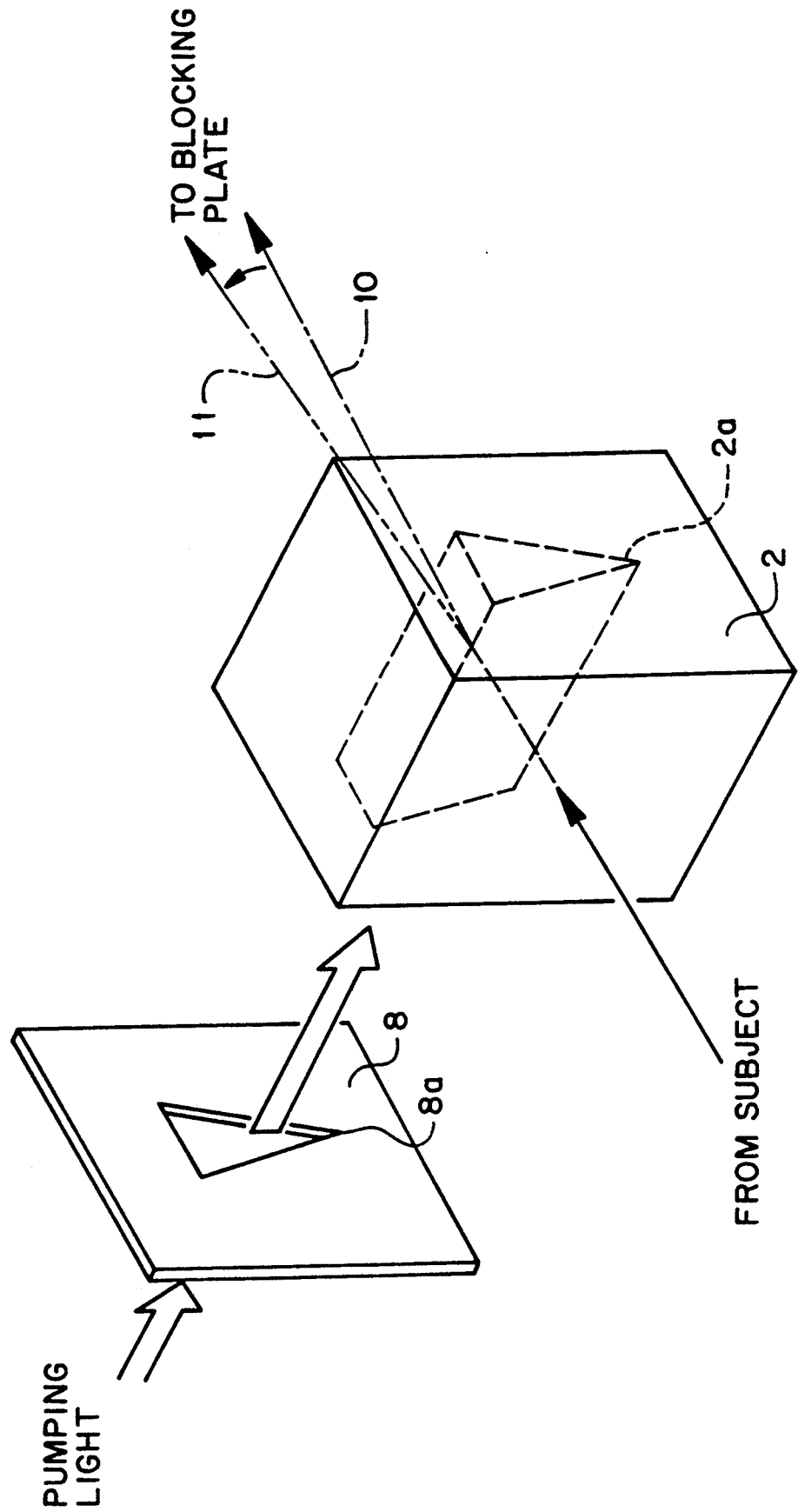
FIG. 2 is a perspective view of a major part of a shuttering unit.

FIG. 2 is a view for explaining the shuttering unit. This shuttering unit does the function of exposing for a required period of time. This shuttering unit comprises a pumping beam source (not shown) for generating a pumping beam for varying a refractive index of the deflection member 2; a restriction plate 8 disposed between the pumping beam source and the deflection member 2; and a ray blocking plate 5 formed behind the deflection member 2. The restriction plate 8 has an aperture 8a. A pumping beam which has passed this aperture 8a suitably varies a refractive index of the deflection member 2 in a spatial region 2a containing the first optical image 3 formed in the deflection member 2. The pumping beam enters the deflection member in FIG. 1 in the direction perpendicular to the sheet. The deflection member 2 suitably deflects the rays from the angle adjusting lens $L_{12}$ in accordance with a change of a refractive index in the spatial region 2a. The ray blocking plate 5 selectively passes a required part of the deflected rays through an aperture 5a formed therein. The aperture may be formed to have variable width.

The shuttering unit will be explained in more detail. The deflection member 2 is made of a nonlinear optical material having an optical refractive index varied by light radiation (having light-induced refractive index modulation), e.g., lithium niobate or others and is rectangular parallelopiped. On one side of the deflection member 2 there is provided a restriction plate 8 with a triangular opening 8a, so that the pumping beam from the pumping beam source is incident in a direction normal to the rays from the angle adjusting lens $L_{12}$. In accordance with this shape, a pumping beam-radiation region 2a of triangular prism shape (equivalent prism) is formed in the deflection member 2. This pumping beam-radiation region 2a varies the refractive index to high or low refractive indexes. Consequently, to give an example, when a pumping beam is absent, the rays from the angle adjusting lens $L_{12}$ travel along the path indicated by the one-dot line 10 in FIG. 2, and when a pumping beam is radiated, the rays take the path 11 indicated by the two dot-line in FIG. 2.

In this structure, the deflection member 2 deflects the rays from a subject 1 and scans the same at a constant velocity. The ray blocking plate 5 allows a portion of deflected-scanned rays which corresponds to a set period of time to pass through the aperture 5a in the surface thereof and to set an exposure time $T_1$. In other words, when the rays are scanned by the deflection member 2, a time in which each ray traverses the aperture 5a is an exposure time $T_1$. The aperture 5a of the ray blocking plate 5 may be circular or have one side parallel with the plane of this sectional view and another side normal to this plane.

The second optical image forming unit comprises the ray blocking plate 5 an image forming lens $L_2$ and an output surface 6. The image forming lens $L_2$ is positioned on the line interconnecting a deflection center occurring in the deflection member 2 and the center of the aperture 5a of the ray blocking plate 5. At the position of the output surface 6 a photographic film, or the photocathode screen of a TV camera is positioned for recording instantaneous images formed on the output surface 6. This second optical image forming unit again forms the first optical image 3 which was formed on the position of a deflection center, on the output surface 6 by the image forming lens L2 as a second optical image.

The optical shutter-camera of FIG. 1 will be explained. The first optical image 3 of a light image AB of a subject 1 is formed by the optical lens $L_{11}$ and others at the position NM of a deflection center occurring in the deflection member 2. FIG. 1 shows the image formation of the respective units by representing the light image of a subject by rays emitted from Points A and B. In the following description that of the rays emitted from Points A and B that passes the center of the lens $L_{11}$ is called principal ray, and arbitrary rays around the principal ray are called marginal rays. Principal rays and marginal rays can be depicted corresponding to all the points constituting the subject 1, but here depicted are principal rays from Points A and B, and the outermost marginal rays passing the aperture of the optical diaphragm 4 from Points A and B. The angle adjusting lens $L_{12}$ adjusts an angle of principal rays at which they enter the deflection member 2 and the aperture 5a of the ray blocking plate 5 so as to be substantially parallel with one another or to gradually reduce slightly the interval between each principal ray and its adjacent one.

Then, in the shuttering unit, a pumping beam is radiated into the deflection member 2 to vary the refractive index. The intensity of the pumping beam is varied at high frequency, i.e., the intensity of the pumping beam ramps up and down and at high frequency, and the refractive index of the equivalent prism in the pumping beam radiation region ramps up and down and at high velocity. Consequently the rays from the subject 1 can be deflected at high velocity. This high-velocity deflection enables the rays from the subject 1 to be scanned on the ray blocking plate 5 and pass the ray blocking plate 5 to the side of the output surface 6 only while the pumping beam is traversing the aperture 5a, and a shuttering operation is conducted.

The rays which have passed through the aperture of the ray blocking plate 5 form an image as a second optical image 13 on the output surface 6 by the image forming lens $L_2$. The second optical image 13 is an unblurred instantaneous image (Points M,N) of the stationary subject. This instantaneous image is recorded as a chemical latent image when the output surface 6 is a film, and when the output surface 6 is the photocathode of a TV camera, this instantaneous image is taken out as picture signals. Thus an image exposed at a required time can be obtained.

The reason why the rays which have passed through the aperture 5a of the ray blocking plate 5 form an unblurred and stationary optical image will be explained below.

Figure 3:
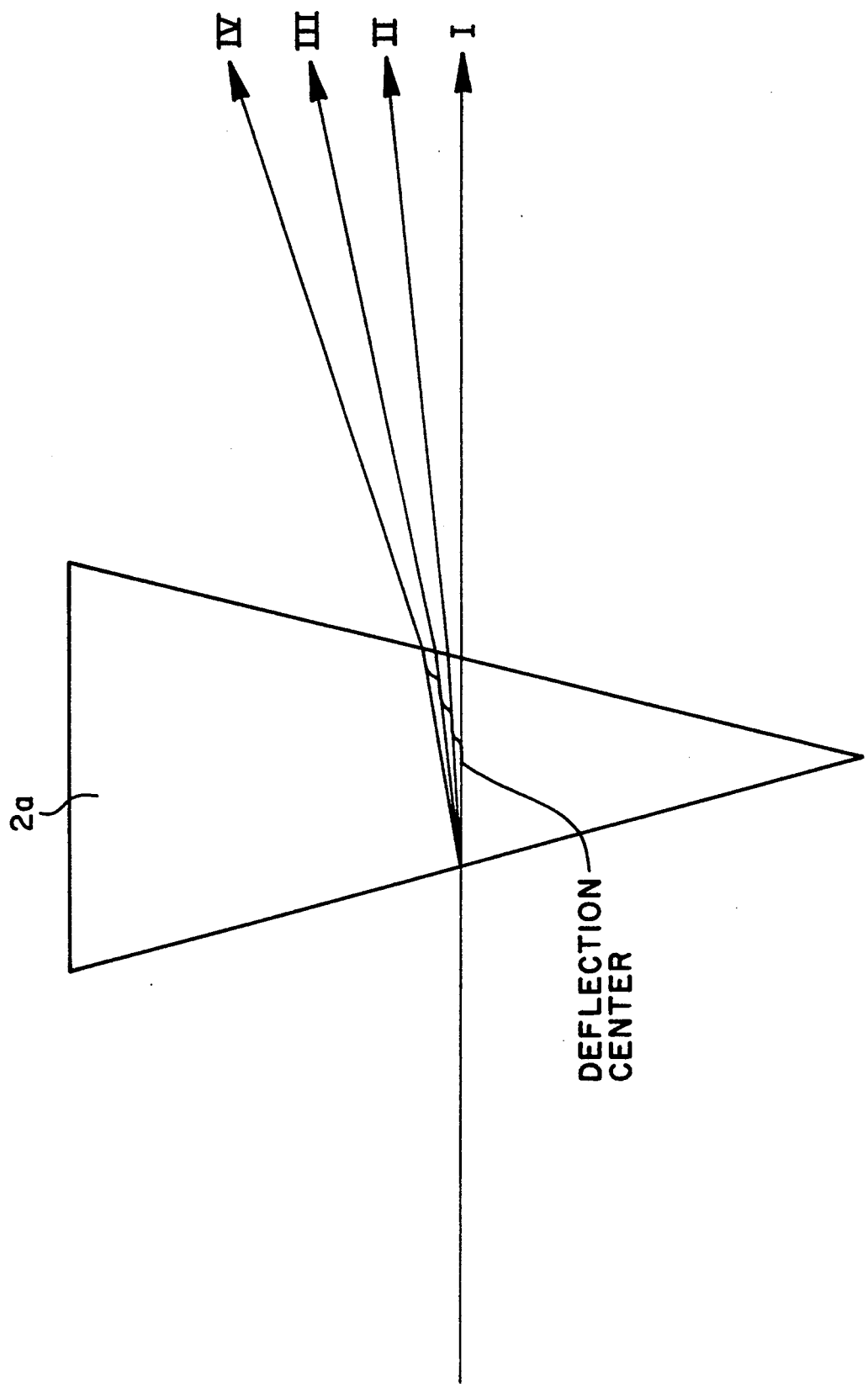
FIG. 3 is a schematic view showing the deflection center.

FIG. 3 shows changes of the paths of the rays which have entered the equivalent prism when the refractive index of the equivalent prism in FIG. 2 is varied. The rays are refracted on the surface of the pumping beam radiation region (the equivalent prism) 2a formed in the deflection member. Its angle of refraction depends, in accordance with Snell's law, on a difference in a refractive index of the region of the deflection member none of a pumping beam reach and that of the equivalent prism of the deflection member. FIG. 3 shows the paths I, II, III, IV of the rays when the refractive index of the equivalent prism is varied by, e.g., four stages of the intensity of the pumping beam. Here what this invention is importantly based on is that when the rays refracted in accordance at a refractive index of the equivalent prism and going out of the same are extended backward, the rays intersect one another at a point called the deflection center. In other words, as viewed on the output side, the rays come out in various directions when the refractive index of the equivalent prism is varied, but all the rays appear to have come out of the same deflection center.

In FIG. 1, a first optical image 3 of the subject 1 is formed at the Points M and N of a deflection center. For example, principal rays emitted from Point A, and its marginal rays form an image on Point M, which is a deflection center. When a pumping beam is radiated, and the refractive index of the equivalent prism is varied, the refracted rays change their directions to I, II, III, IV as if they were emitted from Point M, and are scanned in a direction C. When these rays enter the aperture 5a of the ray blocking plate 5, the rays are projected on the output surface 6 and form a second optical image 13. Those of the rays which have been incident on the part of the ray blocking plate other than the aperture are cut off. This scanning enables the shuttering. A time of scanning from the rays II to IV is an exposure time. This exposure time is determined by a width of the aperture 5a of the ray blocking plate 5 in the direction C of scanning, and a changing velocity of the intensity of a pumping beam (changing velocity of the refractive index of the equivalent prism). The above-described shuttering enables an image of the rays emitted from Point A to be formed on the output surface 6 corresponding to an exposure time. By making the exposure time very short, an unblurred instantaneous image of the rays from Point A can be formed at Point M'. When the width of the aperture is variable in the direction C, the exposure time changes variably.

The above-description has been made with respect to Point A of the subject 1. Similarly by forming an image of the rays from Point B at Point N set as a deflection center, the image can be formed at Point N'. That is, when the light image of the subject from Point A to Point B is formed on plane including Points M, N, which is a collection of deflection centers, the above-described operation can be performed on arbitrary ones of the points from A to B, and the shuttering and image formation are performed. The ray angle adjusting lens $L_{12}$ is used to suppress the divergence of the principal rays to make the rays incident on the deflection member parallel with one another or with a slightly reduced interval between each ray and adjacent one, so that if the principal rays have diverged by the interval where the principal rays pass from the deflection member to the ray blocking plate, the aperture 5a must be elongate in the direction of scanning, and the following lens $L_2$ must have a larger diameter so as not to make the spherical aberration larger. Ignoring errors and other disadvantages, the optical lens $L_2$ can be omitted, and the optical diaphragm 4 can be omitted too.

Figure 4:
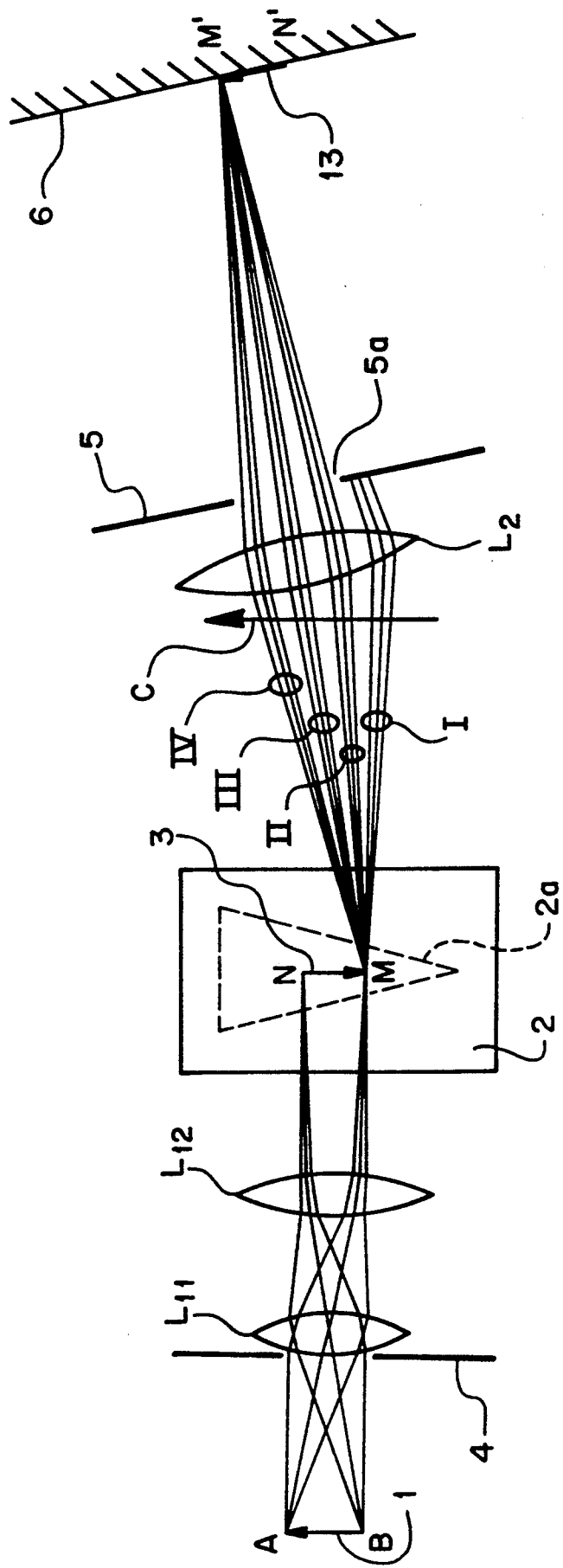
FIG. 4 is a perspective view of a major part of the optical shutter-camera according to the second embodiment of this invention.

FIG. 4 shows the structure of another embodiment of this invention. In this embodiment, the ray blocking plate 5 is positioned between the image forming lens $L_{12}$ and the output surface. This embodiment as well as the above-described embodiment can realize the optical shutter.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

We claim:

1. An optical shutter-camera comprising:

first optical means for receiving image rays from a subject and outputting first optical image rays to form a first optical image of the subject;

deflecting means including a deflection member of a nonlinear optical material whose refractive index is varied by beam radiation; and pumping means for radiating a pumping beam having a variable intensity to a required region of the deflection member and varying the refractive index of the required region to variably deflect optical paths of the first optical image rays from the first optical means, the deflection means being so positioned that a deflection center of the optical paths of the first optical image rays formed when the variable intensity-pumping beam is radiated from the pumping means to the deflection member substantially agree with a position where the first optical image is formed; and second optical means for receiving the first optical image rays from the deflection means and outputting second optical image rays to form a second optical image of the subject, the second optical means including an aperture means for restricting one of the first optical image rays from the deflection means and the second optical image rays.

2. An optical shutter-camera according to claim 1, wherein the pumping means radiates the pumping beam in a direction normal to the optical paths of the first optical image rays, and includes restricting means positioned on an optical path of the pumping beam for defining the required region for the pumping beam to be radiated to.

3. An optical shutter-camera according to claim 2, wherein the restricting means has an aperture having two sides intersecting each other, and the required region for the pumping beam to be radiated to is a three-dimensional shape containing two flat surfaces each intersecting the optical paths of the first optical image rays in the deflection member, and intersecting each other.

4. An optical shutter-camera according to claim 2, wherein
the restricting means has a triangular aperture, and the required region for the pumping beam to be radiated to is a prism having an axis normal to the optical paths of the first optical image rays.

5. An optical shutter-camera according to claim 1, wherein
the first optical means includes an angle adjusting lens for adjusting an angle of the first optical image rays entering the deflection member, and adjusting an angle of the first optical image rays entering the aperture of the aperture means.

6. An optical shutter-camera according to claim 2, wherein
the first optical means includes an angle adjusting lens for adjusting an angle of the first optical image rays entering the deflection member, and adjusting an angle of the first optical image rays entering the aperture of the aperture means.

7. An optical shutter-camera according to claim 2, wherein
the pumping beam source ramps an intensity of the pumping beam up and down.

8. An optical shutter-camera according to claim 1, wherein
the second optical means includes lens means for outputting the second optical image rays, and the aperture means is disposed on the optical paths of the first optical image rays between the deflection member and the lens means.

9. An optical shutter-camera according to claim 2, wherein
the second optical means includes lens means for outputting the second optical image rays, and the aperture means is disposed on the optical paths of the first optical image rays between the deflection member and the lens means.

10. An optical shutter-camera according to claim 1, wherein
the second optical means includes lens means for outputting the second optical image rays, and the aperture means is disposed on optical paths of the second optical image rays behind the lens means.

11. An optical shutter-camera according to claim 2, wherein
the second optical means includes lens means for outputting the second optical image rays, and the aperture means is disposed on optical paths of the second optical image rays behind the lens means.

12. An optical shutter-camera according to claim 1, wherein
the aperture means has an aperture having variable width.

13. An optical shutter-camera according to claim 2, wherein
the aperture means has an aperture having variable width.

* * * * *